(12) United States Patent
Benantar

(10) Patent No.: US 7,356,690 B2
(45) Date of Patent: Apr. 8, 2008

(54) METHOD AND SYSTEM FOR MANAGING A DISTRIBUTED TRUST PATH LOCATOR FOR PUBLIC KEY CERTIFICATES RELATING TO THE TRUST PATH OF AN X.509 ATTRIBUTE CERTIFICATE

(75) Inventor: Messaoud Benantar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1444 days.

(21) Appl. No.: 09/734,810

(22) Filed: Dec. 11, 2000

(65) Prior Publication Data

US 2002/0073308 A1 Jun. 13, 2002

(51) Int. Cl.
*H04L 9/00* (2006.01)
*H04K 1/04* (2006.01)
*H04K 1/06* (2006.01)
*G06F 15/16* (2006.01)
*G06F 7/00* (2006.01)
*G06F 17/30* (2006.01)

(52) U.S. Cl. ............... 713/155; 713/156; 713/157; 709/229; 707/9

(58) Field of Classification Search ........ 713/155–157; 709/229; 380/25, 49, 47; 707/9, 10, 101
See application file for complete search history.

(56) References Cited

U.S. PATENT DOCUMENTS 5,774,552 A * 6/1998 Grimmer ............... 713/156
6,134,550 A * 10/2000 Van Oorschot et al. ......... 707/9
6,615,347 B1 * 9/2003 de Silva et al. ............ 713/156
6,615,350 B1 * 9/2003 Schell et al. ................ 713/168
6,671,804 B1 * 12/2003 Kent ........................ 713/175
2002/0004900 A1 * 1/2002 Patel ........................ 713/155

FOREIGN PATENT DOCUMENTS

EP 869637 A2 * 10/1998

OTHER PUBLICATIONS

Farrell et al., "An Internet Attribute Certificate Profile for Authorization", draft-ietf-pkix-ac509prof-05.txt, Aug. 8, 2000.

* cited by examiner

Primary Examiner—Gilberto Barron
Assistant Examiner—Shin-Hon Chen
(74) Attorney, Agent, or Firm—Hamilton & Terrile, LLP; Michael Rocco Cannatti

(57) ABSTRACT

A method and a system is presented for managing attribute certificates. An extension within an attribute certificate, called a distributed trust path locator, allows an attribute certificate to be physically disassociated from its supporting public key certificates while remaining logically associated with its supporting public key certificates. The user's attribute certificate and its supporting PKCs allows any server using an attribute certificate to locate and retrieve the PKC of the user and of the AC-issuing authority. The user is not required to communicate his/her PKC to a target service. In addition, configuring the target service to accept attribute certificates does not require the deployment of a PKC for every AC-issuing authority.

24 Claims, 9 Drawing Sheets

```
Certificate  ::=  SEQUENCE  {
     tbsCertificate         TBSCertificate,
     signatureAlgorithm     AlgorithmIdentifier,
     signature              BIT STRING  }

TBSCertificate  ::=  SEQUENCE  {
     version         [0]   Version DEFAULT v1,
     serialNumber          CertificateSerialNumber,
     signature             AlgorithmIdentifier,
     issuer                Name,
     validity              Validity,
     subject               Name,
     subjectPublicKeyInfo  SubjectPublicKeyInfo,
     issuerUniqueID  [1]   IMPLICIT UniqueIdentifier OPTIONAL,
     subjectUniqueID [2]   IMPLICIT UniqueIdentifier OPTIONAL,
     extensions      [3]   Extensions OPTIONAL    }

Version  ::=  INTEGER  {  v1(0), v2(1), v3(2)  }

CertificateSerialNumber  ::=  INTEGER

Validity ::= SEQUENCE {
     notBefore             Time,
     notAfter              Time }

Time ::= CHOICE {
     utcTime               UTCTime,
     generalTime           GeneralizedTime }

UniqueIdentifier  ::=  BIT STRING

SubjectPublicKeyInfo  ::=  SEQUENCE  {
     algorithm             AlgorithmIdentifier,
     subjectPublicKey      BIT STRING  }

Extensions  ::=  SEQUENCE SIZE (1..MAX) OF Extension

Extension  ::=  SEQUENCE  {
     extnID                OBJECT IDENTIFIER,
     critical              BOOLEAN DEFAULT FALSE,
     extnValue             OCTET STRING  }
```

Priort Art

Figure 5A

```
AttributeCertificate ::= SEQUENCE {
      acinfo               AttributeCertificateInfo,
      signatureAlgorithm   AlgorithmIdentifier,
      signatureValue       BIT STRING
}

AttributeCertificateInfo ::= SEQUENCE {
      version                 AttCertVersion DEFAULT v1,
      holder                  Holder,
      issuer                  AttCertIssuer,
      signature               AlgorithmIdentifier,
      serialNumber            CertificateSerialNumber,
      attrCertValidityPeriod  AttCertValidityPeriod,
      attributes              SEQUENCE OF Attribute,
      issuerUniqueID          UniqueIdentifier OPTIONAL,
      extensions              Extensions OPTIONAL
}

AttCertVersion ::= INTEGER { v1(0), v2(1) }

Holder ::= SEQUENCE {
      baseCertificateID   [0] IssuerSerial OPTIONAL,
                          -- the issuer and serial number of
                          -- the holder's Public Key Certificate
      entityName          [1] GeneralNames OPTIONAL,
                          -- the name of the claimant or role
      objectDigestInfo    [2] ObjectDigestInfo OPTIONAL
                          -- if present, version must be v2
}

ObjectDigestInfo ::= SEQUENCE {
      digestedObjectType  ENUMERATED {
      publicKey              (0),
      publicKeyCert          (1),
      otherObjectTypes       (2) },
                              -- otherObjectTypes MUST NOT
                              -- be used in this profile
      otherObjectTypeID   OBJECT IDENTIFIER OPTIONAL,
      digestAlgorithm     AlgorithmIdentifier,
      objectDigest        BIT STRING
}
```

Priort Art

Figure 5B

```
AttCertIssuer ::= CHOICE {
        v1Form    GeneralNames,   -- v1 or v2
        v2Form    [0] V2Form      -- v2 only
}

V2Form ::= SEQUENCE {
        issuerName         GeneralNames OPTIONAL,
        baseCertificateID  [0] IssuerSerial OPTIONAL,
        objectDigestInfo   [1] ObjectDigestInfo OPTIONAL
                -- at least one of issuerName, baseCertificateID
                -- or objectDigestInfo MUST be present}

IssuerSerial ::= SEQUENCE {
        issuer     GeneralNames,
        serial     CertificateSerialNumber,
        issuerUID  UniqueIdentifier OPTIONAL
}

AttCertValidityPeriod ::= SEQUENCE {
        notBeforeTime  GeneralizedTime,
        notAfterTime   GeneralizedTime
}

Attribute ::= SEQUENCE {
        type    AttributeType,
        values  SET OF AttributeValue
           -- at least one value is required
}

AttributeType ::= OBJECT IDENTIFIER

AttributeValue ::= ANY DEFINED BY AttributeType
```

Priort Art

Figure 5C

```
PKClocator ::= SEQUENCE {
        holderPKClocator     [0]    GeneralNames OPTIONAL,
        authorityPKClocator  [1]    GeneralNames OPTIONAL
}
``` wherein GeneralNames is defined by IETF RFC2459 as

GeneralNames ::= SEQUENCE SIZE (1..MAX) OF GeneralName

```
GeneralName ::= CHOICE {
        otherName                [0]    OtherName;
        rfc822Name               [1]    IA5String,
        dNSName                  [2]    IA5String,
        x400Address              [3]    ORAddress,
        directoryName            [4]    Name,
        ediPartyName             [5]    EDIPartyName,
        uniformResourceIdentifier [6]   IA5String,
        iPAddress                [7]    OCTET STRING,
        registeredID             [8]    OBJECT IDENTIFIER
}
```

Figure 6

METHOD AND SYSTEM FOR MANAGING A DISTRIBUTED TRUST PATH LOCATOR FOR PUBLIC KEY CERTIFICATES RELATING TO THE TRUST PATH OF AN X.509 ATTRIBUTE CERTIFICATE

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication.

2. Description of Related Art

The commercial use of the Internet has dramatically increased the use of technology. Web-based and Internet-based applications have now become so commonplace that when one learns of a new product or service, one assumes that the product or service will incorporate Internet functionality into the product or service. New applications that incorporate significant proprietary technology are only developed when an enterprise has a significantly compelling reason for doing so. Many corporations have employed proprietary data services for many years, but it is now commonplace to assume that individuals and small enterprises also have access to digital communication services. Many of these services are or will be Internet-based, and the amount of electronic communication on the Internet is growing exponentially.

One of the factors influencing the growth of the Internet is the adherence to open standards for much of the Internet infrastructure. Individuals, public institutions, and commercial enterprises alike are able to introduce new content, products, and services that are quickly integrated into the digital infrastructure because of their ability to exploit common knowledge of open standards.

Concerns about the integrity and privacy of electronic communication have also grown with adoption of Internet-based services. Various encryption and authentication technologies have been developed to protect electronic communication. For example, an open standard promulgated for protecting electronic communication is the X.509 standard for digital certificates.

An X.509 digital certificate is an International Telecommunications Union (ITU) standard that has been adopted by the Internet Engineering Task Force (IETF) body. It cryptographically binds the certificate holder, presumably the subject name within the certificate, with its public cryptographic key. This cryptographic binding is based on the involvement of a trusted entity in the Internet Public Key Infrastructure (PKIX) called the "Certifying Authority". As a result, a strong and trusted association between the certificate holder and its public key can become public information yet remain tamper-proof and reliable. An important aspect of this reliability is a digital signature that the Certifying Authority stamps on a certificate before it is released for use. Subsequently, whenever the certificate is presented to a system for use of a service, its signature is verified before the subject holder is authenticated. After the authentication process is successfully completed, the certificate holder may be provided access to certain information, services, or controller resources, i.e. the certificate holder may be authorized to access certain systems.

A standard for an X.509 Attribute Certificate has been proposed by which attribute certificates would be similar in structure to public key certificates but in which the attribute certificate would not contain a public key. An attribute certificate would be used to certify or otherwise securely bind a set of authorization capabilities to its subject holder. Those capabilities are possibly authenticated and then cryptographically verified by a target service sought by the holder of the attribute certificate, and the attribute certificate may then be used for enabling access to controlled resources.

Within the prior art, establishing a trust path in an attribute certificate requires the presence of the public key certificates for the attribute certificate's issuing authority as well as that of the user of the attribute certificate. Administrative management and processing of information associated with these trust paths can be complex, and the deployment of a standard public key infrastructure is already hampered by the cost of the complexity of the public key infrastructure.

Therefore, it would be advantageous to have a method and system that simplifies the administrative processing associated with the trust paths that are required for valid use of attribute certificates. It would be particularly advantageous to enable a user to carry and present an attribute certificate without simultaneously carrying and presenting the public key certificates that are required by the attribute certificate.

SUMMARY OF THE INVENTION

A method and a system is presented for managing attribute certificates. A target service within a distributed data processing system receives an attribute certificate from a client. A first locator is retrieved from the attribute certificate; the first locator identifies a location of a public key certificate of an issuing authority for the attribute certificate. The public key certificate of the issuing authority for the attribute certificate is then retrieved from the specified location. The attribute certificate is then verified by using the public key certificate of the issuing authority for the attribute certificate. The client is then authorized to have access to the controlled resources in the target service in accordance with authorization attributes stored in the attribute certificate.

An extension within an attribute certificate, called a distributed trust path locator, allows an attribute certificate to be physically disassociated from its supporting public key certificates while remaining logically associated with its supporting public key certificates. The user's attribute certificate and its supporting PKCs allows any server using an attribute certificate to locate and retrieve the PKC of the user and of the AC-issuing authority. The user is not required to communicate his/her PKC to a target service. In addition, configuring the target service to accept attribute certificates does not require the deployment of a PKC for every AC-issuing authority.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5A shows some of the fields of a standard X.509 digital certificate;

FIGS. 5B-5C show some of the fields of an X.509 attribute certificate;

FIG. 6 shows the structure of a Distributed Trust Path Locator for use within an X.509 attribute certificate in accordance with a preferred embodiment of the present invention.

DETAILED DESCRIPTION OF THE INVENTION

Figure 1A:
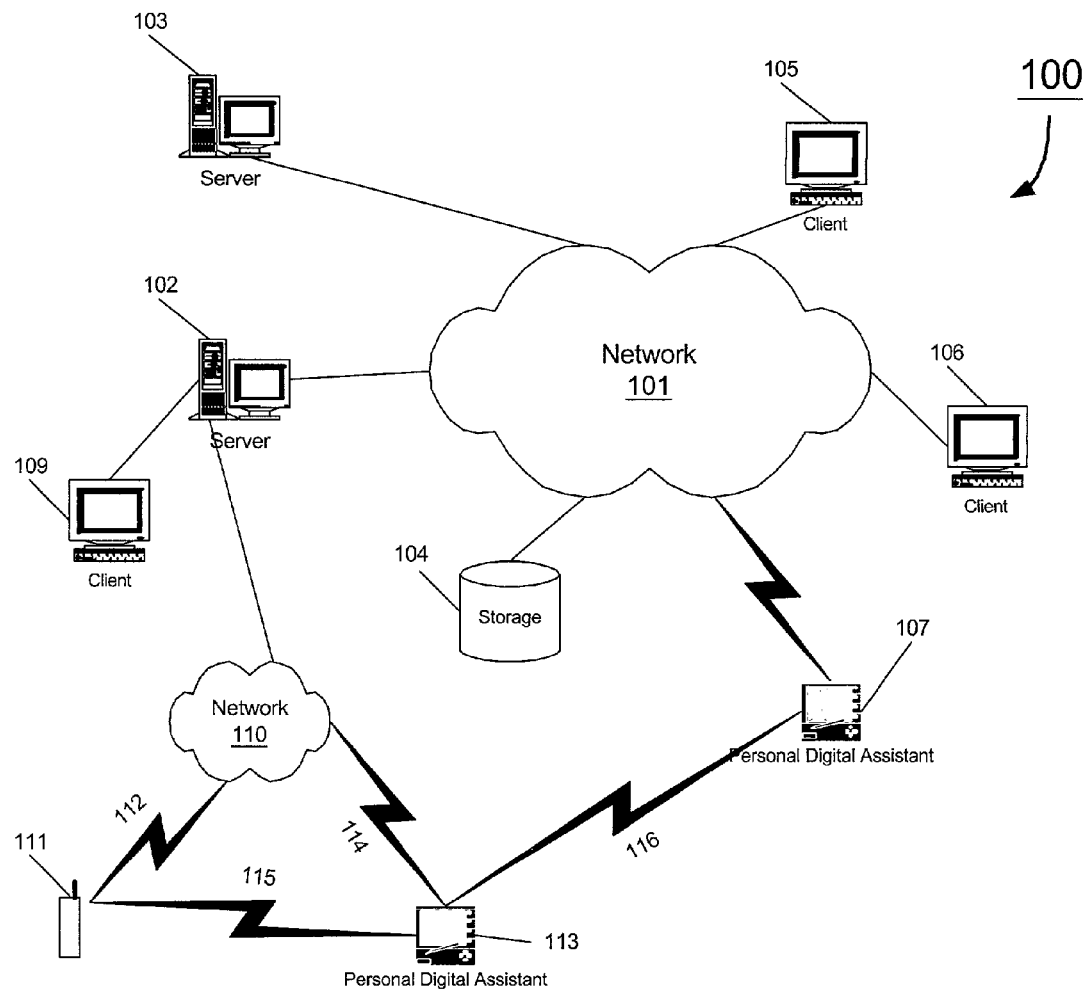
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
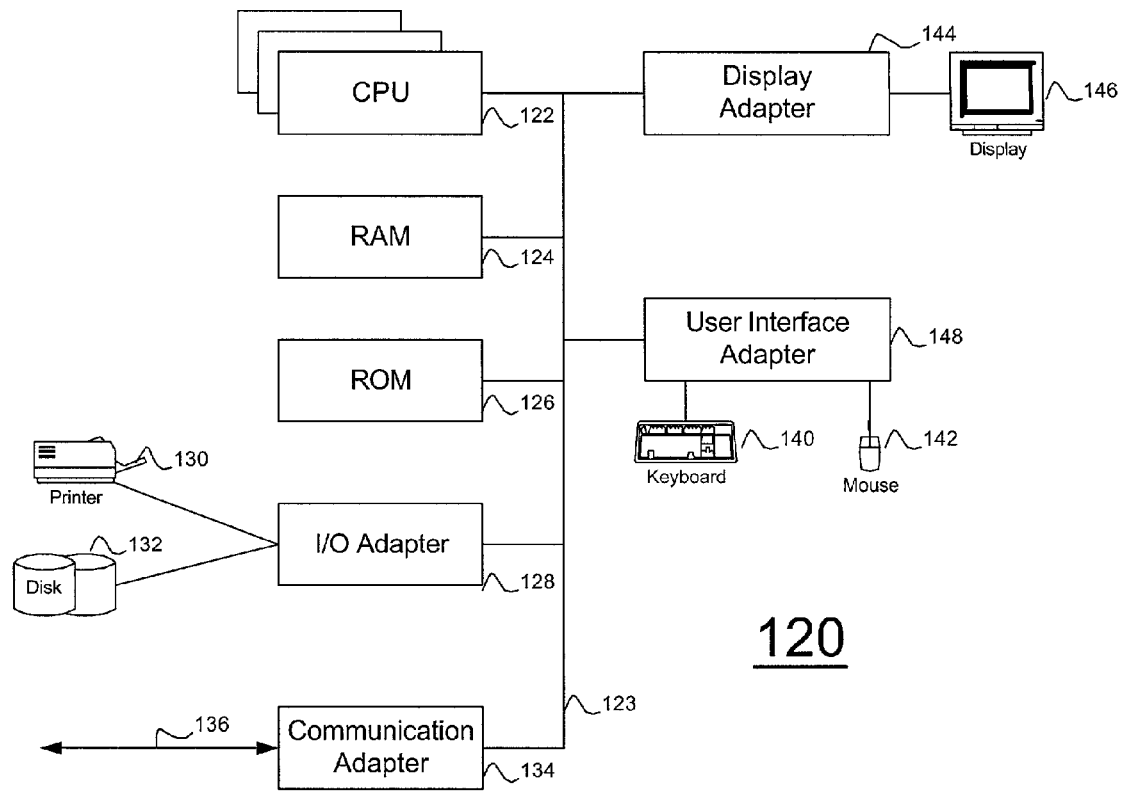
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to providing an authorization methodology that secures user access to applications or systems within a distributed data processing environment. To accomplish this goal, the present invention uses the trusted relationships associated with digital certificates in a novel manner to authorize user access for an application or system. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key to encrypt data, and the receiver uses a private key to decrypt the encrypted message.

When authenticating data, data can be signed by computing a digital signature from the data and the private key of the signer. Once the data is digitally signed, it can be stored with the identity of the signer and the signature that proves that the data originated from the signer. A signer uses a private key to sign data, and a receiver uses the public key to verify the signature. The present invention is directed to a form of authentication using digital certificates; some encryption is also performed during the processing within the present invention.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company like VeriSign that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

Typically, after the CA has received a request for a new digital certificate, which contains the requesting entity's public key, the CA signs the requesting entity's public key with the CA's private key and places the signed public key within the digital certificate. Anyone who receives the digital certificate during a transaction or communication can then use the public key of the CA to verify the signed public key within the certificate. The intention is that an entity's certificate verifies that the entity owns a particular public key.

The X.509 standard is one of many standards that defines the information within a certificate and describes the data format of that information. The "version" field indicates the X.509 version of the certificate format with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be extended in a standardized and generic fashion to include additional information.

In addition to the traditional fields in public key certificates, i.e. those defined in versions 1 and 2 of X.509, version 3 comprises extensions referred to as "standard extensions". The term "standard extensions" refers to the fact that the version 3 of the X.509 standard defines some broadly applicable extensions to the version 2 certificate. However, certificates are not constrained to only the standard extensions, and anyone can register an extension with the appropriate authorities. The extension mechanism itself is completely generic.

Other aspects of certificate processing are also standardized. The Certificate Request Message Format (RFC 2511) specifies a format recommended for use whenever a relying party is requesting a certificate from a CA. Certificate Management Protocols have also been promulgated for transferring certificates. More information about the X.509 public key infrastructure (PKIX) can be obtained from the Internet Engineering Task Force (IETF) at www.ietf.org.

Figure 2:
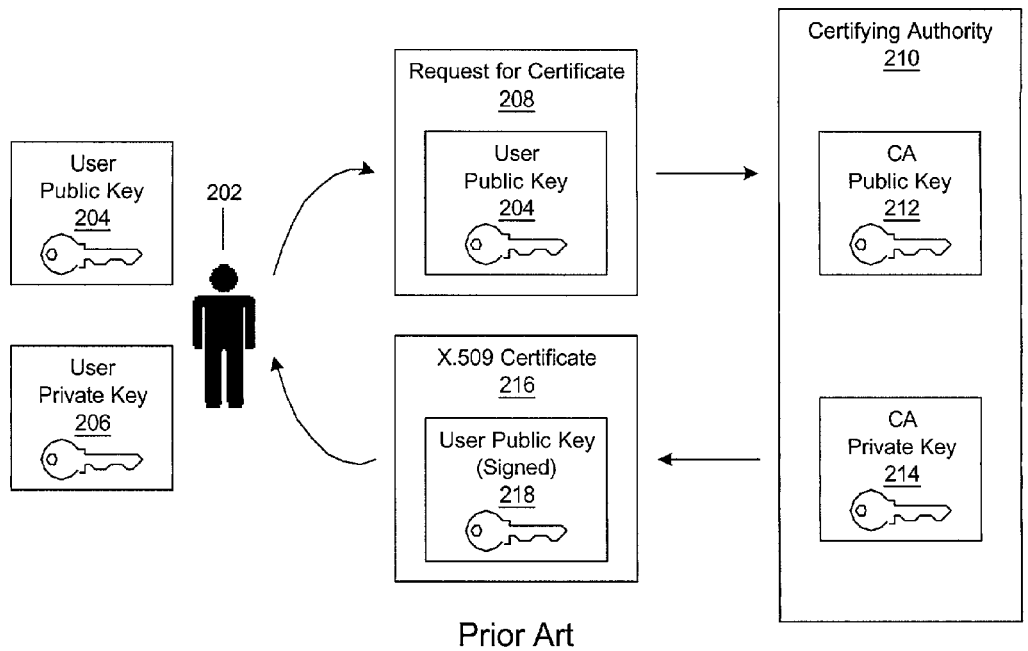
FIG. 2 depicts a typical manner in which an entity obtains a digital certificate.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing signed user public key 218 that was signed with CA private key 214. User 202 receives newly generated digital certificate 216, and user 202 may then publish digital certificate 216 as necessary to engage in trusted transactions or trusted communications. An entity that receives digital certificate 216 may verify the signature of the CA by using CA public key 212, which is published and available to the verifying entity.

Figure 3A:
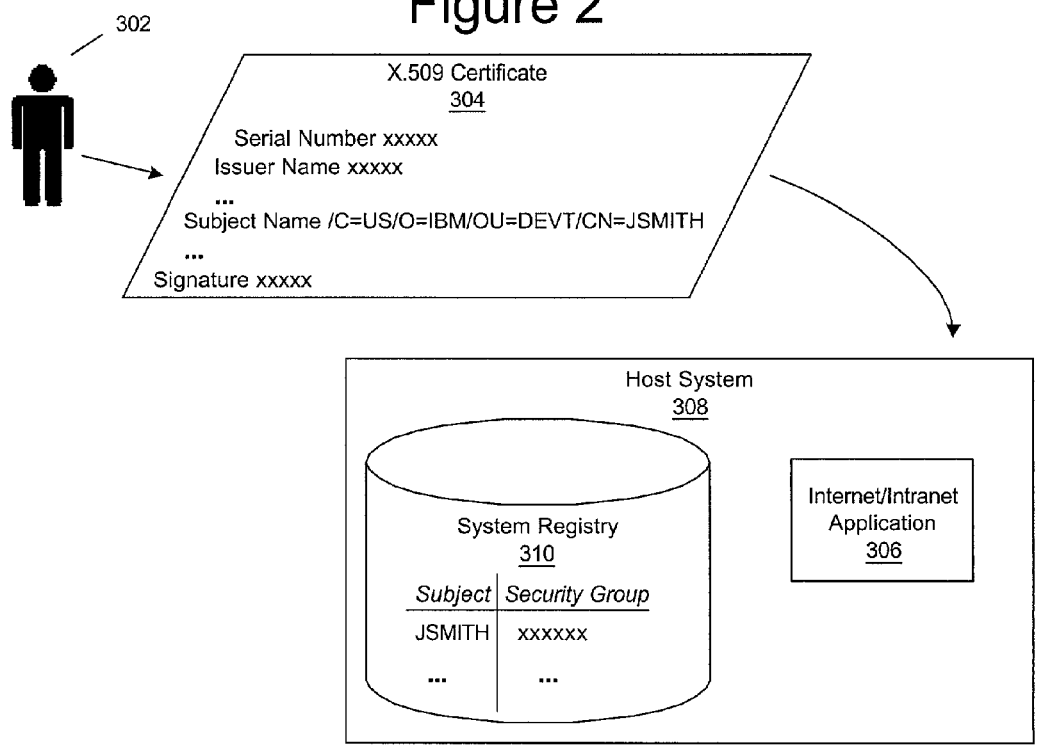
FIG. 3A is a block diagram depicting a typical manner in which an entity may use a digital certificate to be authenticated to an Internet system or application.

With reference now to FIG. 3A, a block diagram depicts a typical manner in which an entity may use a digital certificate to be authenticated to an Internet system or application. User 302 possesses X.509 digital certificate 304, which is transmitted to an Internet or intranet application 306 that comprises X.509 functionality for processing and using digital certificates and that operates on host system 308. The entity that receives certificate 304 may be an application, a system, a subsystem, etc. Certificate 304 contains a subject name or subject identifier that identifies user 302 to application 306, which may perform some type of service for user 302.

Host system 308 may also contain system registry 310 which is used to authorize user 302 for accessing services and resources within system 308, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

In order to facilitate the separation of authentication functions and authorization functions, a standard for an X.509 Attribute Certificate (AC) has been proposed by which attribute certificates (ACs) would be similar in structure to public key certificates (PKCs) but in which the attribute certificate would not contain a public key. An attribute certificate would be used to certify or otherwise securely bind a set of authorization capabilities to its subject holder. Those capabilities are possibly authenticated and then cryptographically verified by a target service sought by the holder of the attribute certificate, and the attribute certificate may then be used for enabling access to controlled resources.

A common analogy using passports and visas has been widely disseminated to explain the differences between public key certificates and attribute certificates. A public key certificate can be analogized to a passport: each identify the holder of the document; each have relatively long validity periods; and each require significant effort to obtain a valid document.

In contrast, an attribute certificate can be analogized to a visa. A visa is used to gain access somewhere in a manner similar to using an attribute certificate to gain access to a system. In addition, a visa must be accompanied by a passport that verifies/authenticates the identity of the holder of the passport and the visa. Similarly, an attribute certificate must be accompanied by a public key certificate to verify/authenticate the identity of the user. A visa is issued by an authority other than the authority that issues a passport, which is similar to an attribute certificate being issued by an authority different from the authority that issues the public key certificate. A visa and an attribute certificate have shorter validity periods than a passport or a public key certificate.

Public key certificates can provide an identity for controlled access purposes. However, merely proving one's identity does not provide one with access to a controlled resource. Instead, a role or group-membership is used; if the user can prove one's identity and that the identity has been previously associated with a role or a group membership, then one may gain access to a controlled resource.

Although it is possible to do so, placing authorization information in a public key extension can be problematic. For example, a user may have a valid identity for a relatively long period of time, but the user's authorized access privileges may change over time with each authorization period being shorter than the valid period of time for the user's identity. If one were to place the authorization information in a public key extension, then the public key certificate would have to be reissued, which would cause a significant administrative burden.

Another problem, as was noted above, is that the authority that issues the public key certificate to verify the identity of a person is usually not the same authority that desires to authorize that person. In fact, a preferred scheme would have relatively few public key certifying authorities on which many other institutions rely while determining the authorization parameters for each individual institution. If the authorization information is placed into a public key extension, then the public key certifying authority must obtain authorization information from each institution to which the user desires to present the public key certificate, which is very difficult administratively.

Hence, it has been recognized that the public key infrastructure would be better served by separating authorization information from authentication information. However, authorization information must still be bound to a holder's identity to be useful.

In order to facilitate such a scheme, an attribute certificate provides a binding between a certificate holder and a set of attributes; the attribute certificate is a digitally signed (or certified) identity and set of attributes. After acquiring an attribute certificate, a user may present the attribute certificate in an attempt to gain access to a controlled resource. When a decision must be made concerning whether a user should have access to the controlled resource, the deciding authority needs to verify the identity of the holder of the attribute certificate.

Hence, an attribute certificate is generally presented along with a public key certificate to access various security services, access controlled services, authentication services, etc. The attribute certificate contains some type of information that links the attribute certificate with a public key certificate, and the public key certificate is used for authentication purposes in conjunction with a request to access the controlled resource.

Figure 3B:
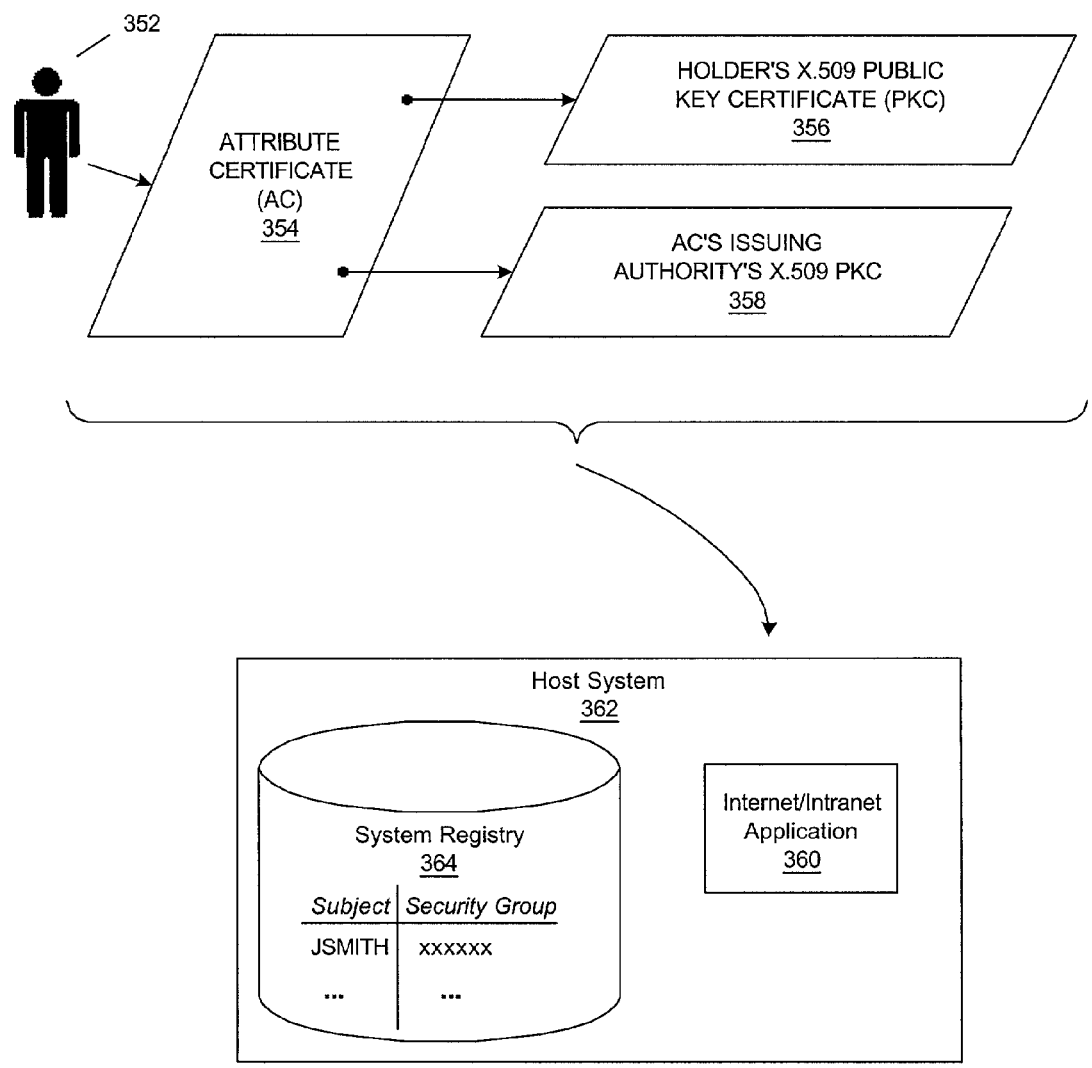
FIG. 3B is a block diagram depicting a typical manner in which an entity may use a digital certificate and an accompanying attribute certificate to be authenticated and authorized to an Internet system or application in order to be granted access to controller resources.

With reference now to FIG. 3B, a block diagram depicts a typical manner in which an entity may use an attribute certificate and its associated public key certificates to be authenticated and authorized to an Internet system or application in order to be granted access to controller resources. User 352 possesses X.509 attribute certificate 354. User 352 sends attribute certificate 354, along with the user's associated PKC 356 and PKC 358 of the issuing authority for the user's attribute certificate, to Internet or intranet application 360 that comprises X.509 functionality and that operates on host system 362. As noted previously, an attribute certificate may contain attributes that specify group membership, role, security clearance, or other authorization information associated with the holder of the attribute certificate. Host system 362 may also contain system registry 364 that allows user 352 to access services and resources within system 360 as specified by information within attribute certificate 354.

In summary of the prior art methodology, an X.509 attribute certificate is a document that has been cryptographically signed by an AC-issuing authority. This signing process uses the private key of the attribute certificate authority, for which there is a corresponding public key published in a public key certificate issued for the attribute-certificate-issuing authority.

In the prior art, an application service that contains PKIX-functionality uses the public key certificate of the user in conjunction with some predefined security protocol in order to establish data origin authenticity/integrity or confidentiality during exchanges with a particular client. At some subsequent point in time, a user may attempt to access a controlled resource at a target service, and the user's access capabilities are determined from the user's attribute certificate. In the prior art, the user sends both his/her attribute certificate and public key certificate to the target service. The two certificates are linked together in some manner; in the X.509 specification, the "Holder" field in the attribute certificate contains linking information for the public key certificate, such as the identity of the public key certificate's issuing authority and the serial number of the holder's public key certificate.

After receiving the user's certificates, the public key certificate of the authority that issued the attribute certificate is needed in order to validate the attribute certificate that has been presented by the user. In general, the target service would be configured with information on all of the AC-issuing authorities that the target service is willing to accept or trust.

In contrast with the prior art methods of using an attribute certificate, such as that shown in FIG. 3B, the present invention provides a novel method by which a user simply carries an attribute certificate while a targeted application server seamlessly determines the location from which to download the public key certificates involved with the validation of the attribute certificate. The present invention introduces the use of a "Distributed Trust Path Locator" for an attribute certificate to accomplish this novel functionality, as explained below in more detail.

The present invention allows the user to send only his/her attribute certificate to the target service; the attribute certificate may contain an indication of the location of the user's public key certificate associated with the user's attribute certificate as well as an indication of the location of the AC-issuing authority's public key certificate, i.e. the AC may contain a Distributed Trust Path Locator. These locations, or locators, are placed within the attribute certificate when the attribute certificate is first generated. The indicated locations are then used by the target service to automatically locate and download the user's PKC and the AC-issuing authority's PKC.

Figure 4:
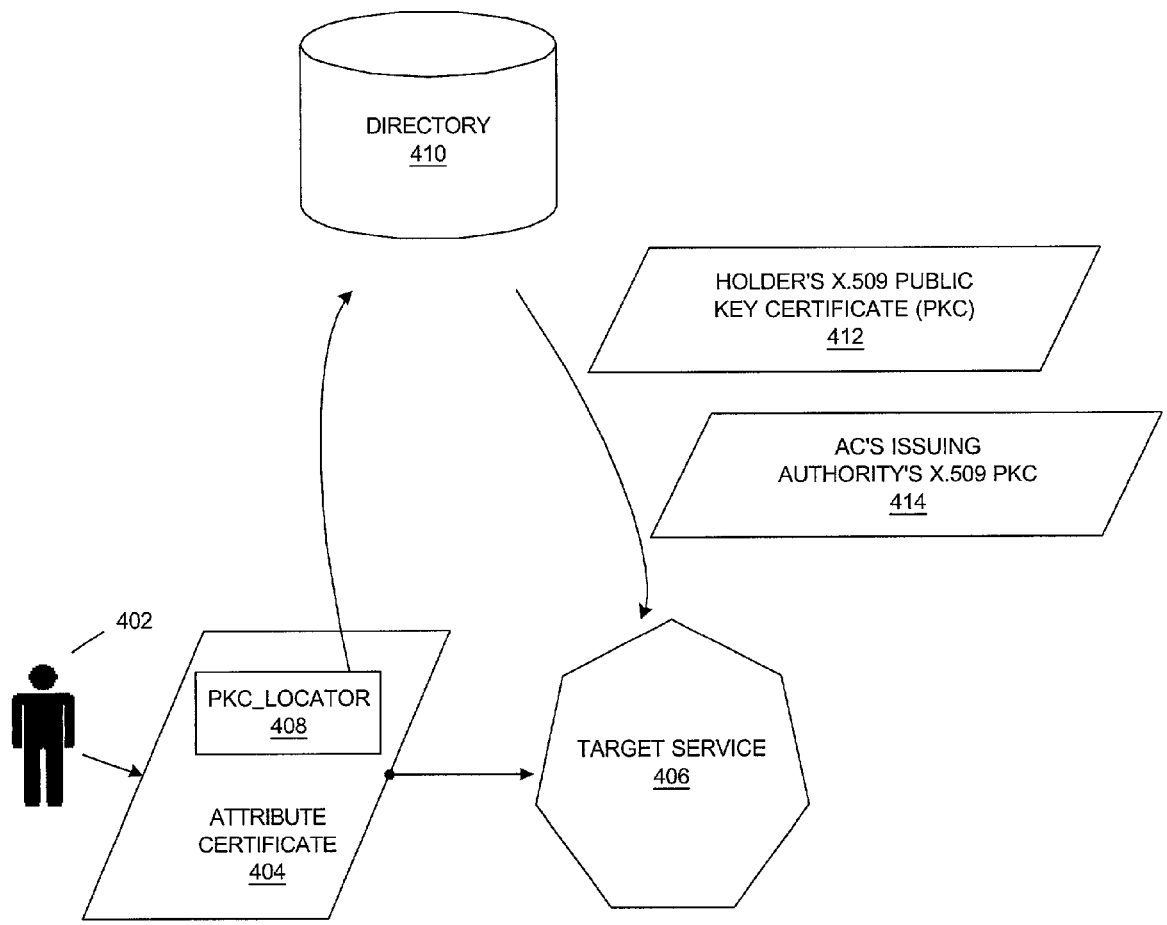
FIG. 4 depicts a block diagram showing a method of using an attribute certificate with a Distributed Trust Path Locator in accordance with a preferred embodiment of the present invention.

With reference now to FIG. 4, a block diagram shows a method of using an attribute certificate with a Distributed Trust Path Locator in accordance with a preferred embodiment of the present invention. FIG. 4 merely provides a graphic manner of depicting the additional functionality provided by the present invention compared to prior art methodologies as shown in FIG. 3B.

User 402 is a valid holder of attribute certificate 404, which user 402 presents to target service 406 to access a controlled resource. Target service 406 extracts PKC_LOCATOR 408, which is a Distributed Trust Path Locator, and uses PKC_LOCATOR 408 to locate a database or directory service, such as directory 410, that stores the PKCs that are needed by target service 406 to validate attribute certificate 404. Directory 410 then returns user's PKC 412 and PKC 414 of the issuing authority of attribute certificate 404. It should be noted that the user's PKC and the AC-issuing authority's PKC are not necessarily stored within the same directory or database, i.e. PKC_LOCATOR 408 may contain separate locations for both PKCs.

With the present invention, a PKIX-enabled application server is not required to be configured with the AC-issuing authority public key certificates of the AC-issuing authorities that the application server trusts. Furthermore, there is no limit to what a server can trust with respect to AC-issuing authorities as long as the validation chains of the required public key certificates lead to trusted PKIX certifying authorities. Ultimately, the validation steps should lead to constructing the X.509 PKC chain leading to the root trusted certifying authority for both the PKC of the AC-issuing authority as well as the user's PKC.

With reference now to FIG. 5A, some of the fields of a standard X.509 digital certificate are shown. The constructs shown in FIG. 5A are in Abstract Syntax Notation 1 (ASN.1) and are defined within the X.509 standard.

With reference now to FIGS. 5B-5C, some of the fields of an X.509 attribute certificate are shown. The constructs shown in FIGS. 5B-5C are also in ASN.1 notation.

With reference now to FIG. 6, a diagram shows the structure of a Distributed Trust Path Locator for use within an X.509 attribute certificate in accordance with a preferred embodiment of the present invention. The attribute certificate contains the Distributed Trust Path Locator that is used at the target service to determine and acquire the public key certificates necessary in the attribute certificate validation process. In the preferred embodiment, the Distributed Trust Path Locator is inserted as an extension in the standard extensions field of the associated attribute certificate, as shown in FIG. 6 using ASN.1 notation. The "PKClocator" field in FIG. 6 is similar to the PKC_LOCATOR data item shown in FIG. 4. The "PKClocator" field contains two data items: a locator for the PKC of the holder of the attribute certificate; and a locator for the PKC of the issuing authority of the attribute certificate. The content within the locator may have a variety of formats, as shown in FIG. 6. An application server uses the attribute certificates' PKClocator extension to locate the distributed PKC of the AC-issuing authority and possibly that of the user if so desired. The location is generic enough to allow for different types of network or local locations, most notably a directory name that can point to an LDAP (Lightweight Directory Access Protocol) service URI.

It should be noted that the Distributed Trust Path Locator is not limited to being incorporated within only the X.509 standard and that the X.509 standard is merely one set of definitions of digital certificates in which the Distributed Trust Path Locator of the present invention could be incorporated; the present invention may also use other digital certificate standards or formats other than X.509 as long as the digital certificates can convey the required information.

Moreover, the Distributed Trust Path Locator does not necessarily have to be incorporated as an extension into an X.509 attribute certificate, and that over time, as the X.509 standard changes, the Distributed Trust Path Locator of the present invention could become a standard field of an attribute certificate. Additionally, it should be noted that the format of the extension containing the Distributed Trust Path Locator could vary from the format shown in FIG. 6.

Figure 7:
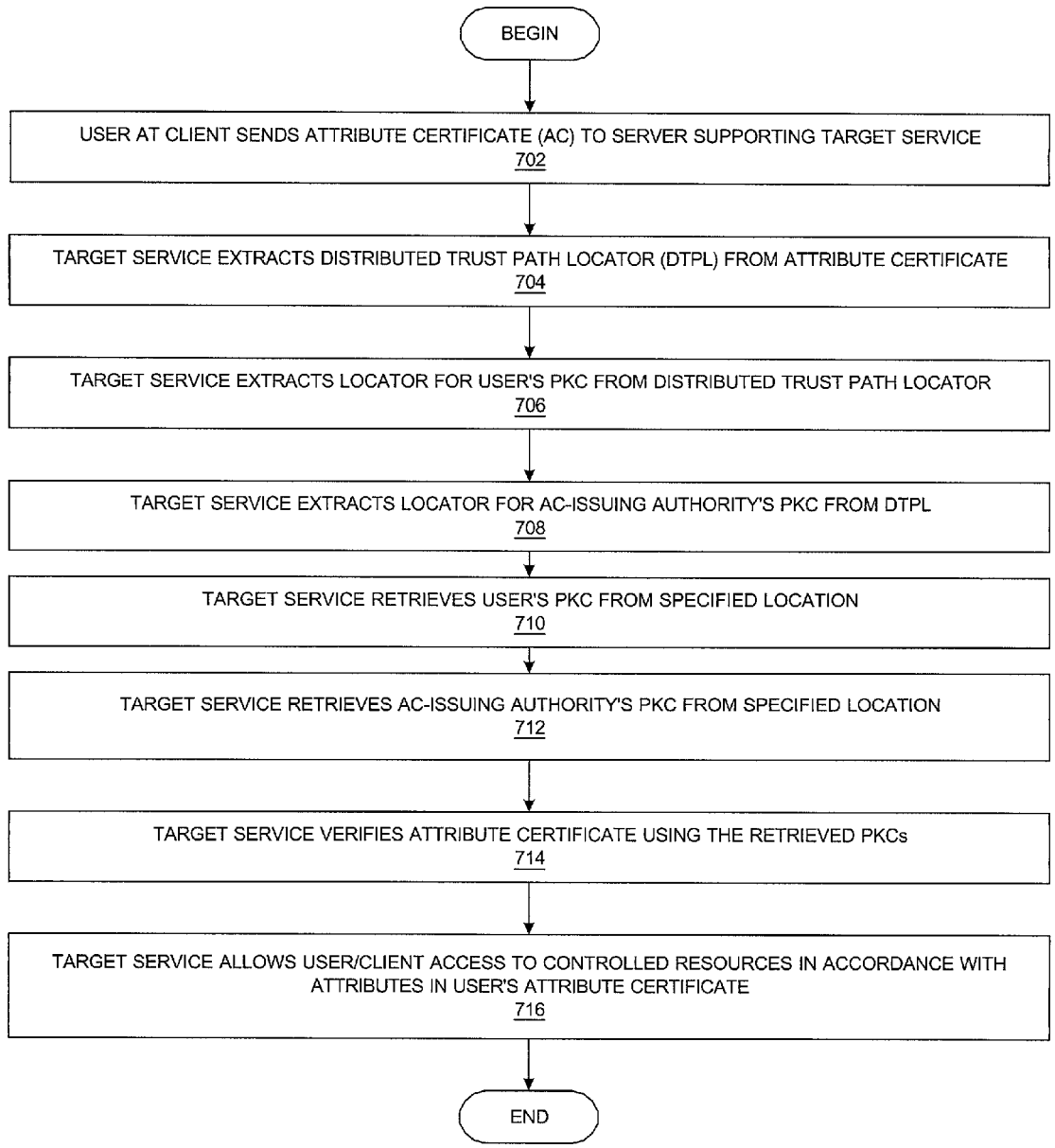
FIG. 7 shows a flowchart depicting the processing of an attribute certificate for authorizing a certificate holder on a system using the Distributed Trust Path Locator methodology of the present invention.

With reference now to FIG. 7, a flowchart depicts the processing of an attribute certificate for authorizing a certificate holder on a system using the Distributed Trust Path Locator methodology of the present invention. The processing begins in FIG. 7 with a user at a client system sending an attribute certificate to a server supporting a target service (step 702). The target service extracts the Distributed Trust Path Locator from the attribute certificate (step 704), from which the locator for the user's PKC is extracted (step 706) and the locator for the AC-issuing authority's PKC is also extracted (step 708).

It should be noted again that a locator for the user's PKC does not necessarily have to be included in the attribute certificate if it is not required by the target service to authenticate the user. However, in order to verify the attribute certificate, the AC-issuing authority's PKC must be obtained.

The target service then retrieves the user's PKC from the location specified by the extracted locator for the user's PKC (step 710), and the target service also retrieves the AC-issuing authority's PKC from the location specified by the extracted locator for AC-issuing authority's PKC (step 712). The order in which the PKCs are retrieved is not relevant, and the PKCs may be retrieved in parallel. After receiving the PKCs, the target service verifies the attribute certificate using the retrieved PKCs (step 714), and assuming that the verification is successful, then the target service may allow the user or client to have access to the controlled resource's of the target service in accordance with the authorization attributes in the user's attribute certificate (step 716). The process of authorizing the client through an attribute certificate using a Distributed Trust Path Locator is then complete.

The advantages of the present invention should be apparent in view of the detailed description of the invention that is provided above. By using a novel extension within an attribute certificate called a distributed trust path locator, the present invention allows an attribute certificate to be physically disassociated from its supporting public key certificates while remaining logically associated with its supporting public key certificates. The present invention couples the user's attribute certificate and its supporting PKCs in a way that allows any server using an attribute certificate to locate and retrieve the PKC of the user and of the AC-issuing authority. The user is not required to communicate his/her PKC to a target service. In addition, configuring the target service to accept attribute certificates does not require the deployment of a PKC for every AC-issuing authority.

The methodology provided by the present invention is particularly useful to smaller, portable devices, such as Internet-enabled phones and PDAs which have less storage space and simpler applications. The present invention does not contribute any additional complexity to the usage model and certificate validation process of PKIX than the prior art methodologies for using attribute certificates.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for authorizing access to controlled resources within a distributed data processing system, the method comprising:
   receiving an attribute certificate from a client at a host within the distributed data processing system;
   extracting a first locator from the attribute certificate, wherein the first locator identifies a location of a public key certificate of an issuing authority for the attribute certificate;
   retrieving the public key certificate of the issuing authority for the attribute certificate;
   verifying the attribute certificate using the public key certificate of the issuing authority for the attribute certificate; and
   authorizing the client to have access to the controlled resources in accordance with authorization attributes stored in the attribute certificate.

2. The method of claim 1 further comprising:
   extracting a second locator from the attribute certificate, wherein the second locator identifies a location of a public key certificate of a holder of the attribute certificate;
   retrieving the public key certificate of the holder of the attribute certificate;
   authenticating the holder using the public key certificate of the holder.

3. The method of claim 1 wherein the attribute certificate and the public key certificate of the issuing authority for the attribute certificate are formatted according to the X.509 standard.

4. The method of claim 1 wherein the first locator is stored within an X.509 extension within the attribute certificate.

5. A method for obtaining authorized access to controlled resources within a distributed data processing system, the method comprising:
   sending an attribute certificate from a client to a host within the distributed data processing system, wherein the attribute certificate comprises a first locator that identifies a location of a public key certificate of an issuing authority for the attribute certificate; and
   receiving authorization for the client to access the controlled resources in accordance with authorization attributes stored in the attribute certificate, wherein the authorization was dependent upon verification of the attribute certificate using the public key certificate of the issuing authority for the attribute certificate, where the public key certificate was retrieved using the first locator from the attribute certificate.

6. The method of claim 5, wherein the attribute certificate comprises a second locator that identifies a location of a public key certificate of a holder of the attribute certificate, further comprising:
   receiving authentication for a holder of the attribute certificate.

7. A method for generating a digital certificate, the method comprising:
   receiving, at an attribute-certificate-issuing authority, a request for an attribute certificate from a client;
   generating the attribute certificate in response to the received request for an attribute certificate, wherein the attribute certificate comprises a first locator that identifies a location of a public key certificate of the attribute-certificate-issuing authority; and
   sending the generated attribute certificate to the client for use in obtaining authorization by verifying the attribute certificate using the public key certificate that is retrieved using the first locator from the attribute certificate.

8. The method of claim 7 further comprising:
retrieving from the request for an attribute certificate a second locator that identifies a location of a public key certificate of a subsequent holder of the attribute certificate; and
embedding in the attribute certificate the second locator.

9. An apparatus for authorizing access to controlled resources within a distributed data processing system, the apparatus comprising:
receiving means for receiving an attribute certificate from a client at a host within the distributed data processing system;
first extracting means for extracting a first locator from the attribute certificate, wherein the first locator identifies a location of a public key certificate of an issuing authority for the attribute certificate;
first retrieving means for retrieving the public key certificate of the issuing authority for the attribute certificate;
verifying means for verifying the attribute certificate using the public key certificate of the issuing authority for the attribute certificate; and
authorizing means for authorizing the client to have access to the controlled resources in accordance with authorization attributes stored in the attribute certificate.

10. The apparatus of claim 9 further comprising:
second extracting means for extracting a second locator from the attribute certificate, wherein the second locator identifies a location of a public key certificate of a holder of the attribute certificate;
second retrieving means for retrieving the public key certificate of the holder of the attribute certificate;
authenticating means for authenticating the holder using the public key certificate of the holder.

11. The apparatus of claim 9 wherein the attribute certificate and the public key certificate of the issuing authority for the attribute certificate are formatted according to the X.509 standard.

12. The apparatus of claim 9 wherein the first locator is stored within an X.509 extension within the attribute certificate.

13. An apparatus for obtaining authorized access to controlled resources within a distributed data processing system, the apparatus comprising:
sending means for sending an attribute certificate from a client to a host within the distributed data processing system, wherein the attribute certificate comprises a first locator that identifies a location of a public key certificate of an issuing authority for the attribute certificate; and
first receiving means for receiving authorization for the client to access the controlled resources in accordance with authorization attributes stored in the attribute certificate, wherein the authorization was dependent upon verification of the attribute certificate using the public key certificate of the issuing authority for the attribute certificate, where the public key certificate was retrieved using the first locator from the attribute certificate.

14. The apparatus of claim 13, wherein the attribute certificate comprises a second locator that identifies a location of a public key certificate of a holder of the attribute certificate, further comprising:
second receiving means for receiving authentication for a holder of the attribute certificate.

15. An apparatus for generating a digital certificate, the apparatus comprising:
receiving means for receiving, at an attribute-certificate-issuing authority, a request for an attribute certificate from a client;
generating means for generating the attribute certificate in response to the received request for an attribute certificate, wherein the attribute certificate comprises a first locator that identifies a location of a public key certificate of the attribute-certificate-issuing authority; and
sending means for sending the generated attribute certificate to the client for use in obtaining authorization by verifying the attribute certificate using the public key certificate that is retrieved using the first locator from the attribute certificate.

16. The apparatus of claim 15 further comprising:
retrieving means for retrieving from the request for an attribute certificate a second locator that identifies a location of a public key certificate of a subsequent holder of the attribute certificate; and
embedding means for embedding in the attribute certificate the second locator.

17. A computer program product in a computer readable storage medium for use in a distributed data processing system for authorizing access to controlled resources within the distributed data processing system, the computer program product comprising:
instructions for receiving an attribute certificate from a client at a host within the distributed data processing system;
instructions for extracting a first locator from the attribute certificate, wherein the first locator identifies a location of a public key certificate of an issuing authority for the attribute certificate;
instructions for retrieving the public key certificate of the issuing authority for the attribute certificate;
instructions for verifying the attribute certificate using the public key certificate of the issuing authority for the attribute certificate; and
instructions for authorizing the client to have access to the controlled resources in accordance with authorization attributes stored in the attribute certificate.

18. The computer program product of claim 17 further comprising:
instructions for extracting a second locator from the attribute certificate, wherein the second locator identifies a location of a public key certificate of a holder of the attribute certificate;
instructions for retrieving the public key certificate of the holder of the attribute certificate;
instructions for authenticating the holder using the public key certificate of the holder.

19. The computer program product of claim 17 wherein the attribute certificate and the public key certificate of the issuing authority for the attribute certificate are formatted according to the X.509 standard.

20. The computer program product of claim 17 wherein the first locator is stored within an X.509 extension within the attribute certificate.

21. A computer program product in a computer readable storage medium for use in a distributed data processing system for obtaining authorized access to controlled resources within the distributed data processing system, the computer program product comprising:

instructions for sending an attribute certificate from a client to a host within the distributed data processing system, wherein the attribute certificate comprises a first locator that identifies a location of a public key certificate of an issuing authority for the attribute certificate; and instructions for receiving authorization for the client to access the controlled resources in accordance with authorization attributes stored in the attribute certificate, wherein the authorization was dependent upon verification of the attribute certificate using the public key certificate of the issuing authority for the attribute certificate, where the public key certificate was retrieved using the first locator from the attribute certificate.

22. The computer program product of claim 21, wherein the attribute certificate comprises a second locator that identifies a location of a public key certificate of a holder of the attribute certificate, further comprising:

instructions for receiving authentication for a holder of the attribute certificate.

23. A computer program product in a computer readable storage medium for use in a data processing system for generating a digital certificate, the computer program product comprising:

instructions for receiving, at an attribute-certificate-issuing authority, a request for an attribute certificate from a client;

instructions for generating the attribute certificate in response to the received request for an attribute certificate, wherein the attribute certificate comprises a first locator that identifies a location of a public key certificate of the attribute-certificate-issuing authority; and instructions for sending the generated attribute certificate to the client for use in obtaining authorization by verifying the attribute certificate using the public key certificate that is retrieved using the first locator from the attribute certificate.

24. The computer program product of claim 23 further comprising:

instructions for retrieving from the request for an attribute certificate a second locator that identifies a location of a public key certificate of a subsequent holder of the attribute certificate; and instructions for embedding in the attribute certificate the second locator.

* * * * *